United States Patent [19]

Smith

[11] Patent Number: 5,721,533

[45] Date of Patent: Feb. 24, 1998

[54] CABLE DEPLOYMENT MONITORING ARRANGEMENT

[75] Inventor: Robert A. Smith, Bethlehem, Pa.

[73] Assignee: Lucent Technologies Inc., Murray Hill, N.J.

[21] Appl. No.: 678,938

[22] Filed: Jul. 12, 1996

[51] Int. Cl.$^6$ ................................................ G08B 21/00
[52] U.S. Cl. ................................................ 340/686; 340/677
[58] Field of Search ................................. 340/686, 687, 340/677; 242/178, 388.5

[56] References Cited

U.S. PATENT DOCUMENTS 5,522,561  6/1996  Koyamatsu et al. .......... 242/178
5,526,997  6/1996  Karczmer .................... 242/388.5

FOREIGN PATENT DOCUMENTS 2501373  7/1975  Germany ...................... 340/686

Primary Examiner—Thomas Mullen
Assistant Examiner—Sihong Huang

[57] ABSTRACT

An arrangement for monitoring the deployment of cable from a cable supply includes reflective tape disposed on the exterior of the cable at longitudinally spaced locations. Light having a predetermined wavelength characteristic is directed toward the cable as it passes a defined area. The reflection of the light is sensed and a signal is provided when the sensed light exceeds a predetermined level. This signal is utilized to determine the length of cable deployed from the supply. In addition, a second type of tape having a lower reflectivity is disposed on the cable immediately preceding enlarged diameter sections of the cable. This latter tape does not reflect sufficient light to generate the predetermined signal but is visible to a human observer so that the cable pulling equipment can be adjusted to accommodate the enlarged diameter section.

6 Claims, 1 Drawing Sheet

CABLE DEPLOYMENT MONITORING ARRANGEMENT

This invention was made with Government support. The Government has certain rights in this invention.

BACKGROUND OF THE INVENTION

This invention relates to the deployment of cable from a supply and, more particularly, to an arrangement for monitoring such deployment.

When communications cable is deployed from a cable laying ship to form a trans-oceanic cable, the cable supply in the hold of the ship may comprise hundreds of kilometers of cable. Such cable is typically pulled from the supply by a cable engine and passes through a suitable opening in the bulkhead of the ship, from which it drops to the ocean floor. A need therefore exists to provide an arrangement which keeps track of the amount of cable which has been thus deployed.

Communications cable includes relatively long lengths of substantially uniform diameter cable. In the case of fiber optic cable, some standard cable is about 8 mm in diameter. However, every so often a section of the cable is of enlarged diameter, holding a splice or a repeater, for example. The cable engine which pulls the cable from the supply does so by frictionally engaging the cable with rollers which are resiliently biased toward each other. When a "large body" approaches the cable engine, the cable engine must be adjusted to accept this enlarged diameter section between its rollers. Accordingly, there also exists a need for providing an arrangement by means of which an operator, can be apprised of the approach of an enlarged diameter section of the cable so that the cable engine can be adjusted.

SUMMARY OF THE INVENTION

In accordance with the principles of this invention, there is provided an arrangement for monitoring the deployment past a defined area of cable from a supply. The inventive arrangement comprises a plurality of pieces of a first material having a first predetermined reflectivity characteristic and disposed at respective discrete longitudinally spaced locations on the exterior surface of the cable. Emitting means emits light having a predetermined wavelength characteristic and directs the emitted light toward the defined area. Sensing means senses light emanating from the defined area and provides a predetermined signal when sensed light having the predetermined wavelength characteristic exceeds a predetermined level. A utilization means receives the predetermined signal and uses the predetermined signal to determine the length of cable deployed from the supply. The first predetermined reflectivity characteristic is such that light having the predetermined wavelength characteristic and reflected from the first material in the defined area is sensed by the sensing means to be at a level exceeding the predetermined level, so that the predetermined signal is generated.

In accordance with an aspect of this invention, at least one piece of a second material having a second predetermined reflectivity characteristic is disposed on the exterior of the cable. The second material is of a contrasting color with respect to the cable and the second predetermined reflectivity characteristic is sufficiently less than the first predetermined reflectivity characteristic so that light having the predetermined wavelength characteristic and reflected from the second material in the defined area is sensed by the sensing means to be at a level which is less than the predetermined level. Accordingly, the second material can be detected by a human observer without resulting in the generation of the predetermined signal.

In accordance with another aspect of this invention, the piece of second material is disposed on a uniform diameter length of the cable immediately preceding an enlarged diameter section. Accordingly, a human observer is notified in advance of the imminent passage of an enlarged diameter section of the cable past the defined area.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
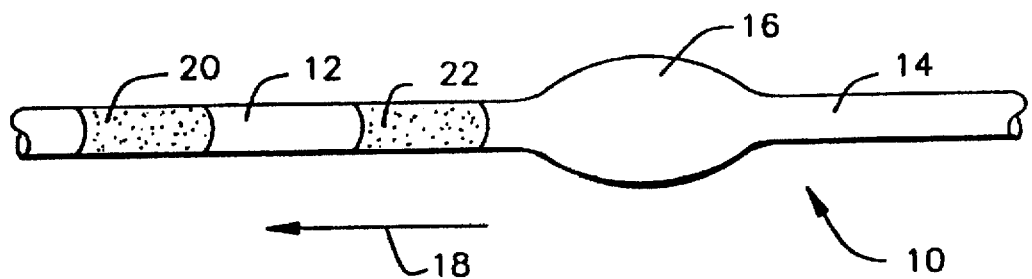
FIG. 1 depicts a length of cable modified in accordance with the principles of this invention.

Referring to the drawings, FIG. 1 illustrates a section of cable, designated generally by the reference numeral 10, deployable from a supply and capable of being monitored in accordance with this invention. As shown, the cable 10 has uniform diameter sections 12, 14 separated by an enlarged diameter section 16. The cable 10 is moved in the direction indicated by the arrow 18. First and second pieces of reflective tape 20, 22, respectively, are disposed on the exterior of the cable 10. As will be discussed in full detail hereinafter, the pieces of tape 20, 22 have different reflectivity characteristics and are used for different purposes.

Figure 2:
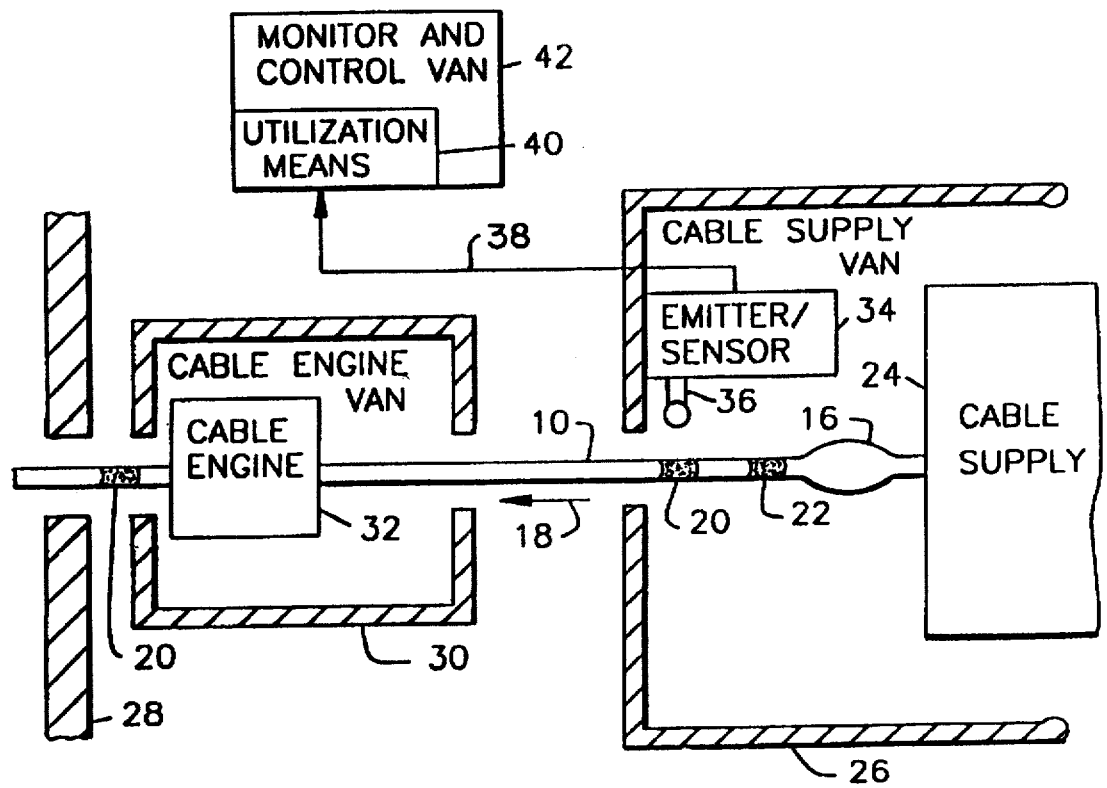
FIG. 2 illustrates in schematic form a cable laying system incorporating an arrangement according to the principles of this invention.

As shown in FIG. 2, before being deployed, the cable 10 is contained within a cable supply 24. The cable supply 24 may be in the form of one or more large reels around which the cable 10 is wound or in the form of canisters holding the cable 10. The cable supply 24 is contained within a cable supply van 26 which is shown as being within the hold of a ship having a bulkhead 28. The cable 10 leaves the cable supply 24 and passes through a cable engine van 30, containing a cable engine 32. The cable engine 32 is a powered device which pulls the cable 10 from the supply 24 to deploy the cable through the bulkhead 28 into the water.

According to this invention, disposed within the cable supply van 26 is an emitter/sensor device 34, illustratively an FX-7 photoelectric sensor distributed by DAS of West Suffield, Conn. The emitter/sensor device 34 has an armor protected fiber optic cable 36 extending outwardly therefrom and directed toward the cable 10 within the van 26. The emitter/sensor device 34 illustratively emits light at a wavelength in the range of about 600 nanometers to about 700 nanometers. The reflective tape 20 is illustratively type 7610 high gain tape marketed by 3M Company. The tape 20 is silver in color and has high reflectivity of light at the wavelength emitted by the emitter/sensor device 34. The emitter/sensor device 34 is arranged to provide a predetermined signal on the lead 38 when it senses light having a wavelength in the 600–700 nanometer range which exceeds a predetermined level. The lead 38 is coupled to the utilization means 40 within the monitor and control van 42. Pieces of the tape 20 are placed at longitudinally spaced locations on the cable 10 while it is being placed into the supply 24. Illustratively, pieces of the tape 20 may be separated by one kilometer lengths of the cable 10. Thus, the utilization means 40 may illustratively contain a counter which is incremented each time the predetermined signal appears on the lead 38, thereby providing an indication of the number of kilometers of cable 10 deployed from the supply 24.

The tape 22 is illustratively a yellow low reflectivity tape which is readily observable by a human observer stationed within the cable supply van 26 but which does not sufficiently reflect light emitted from the emitter/sensor device 34 to generate the predetermined signal on the lead 38. Pieces of the tape 22 are disposed on the cable 10 immediately preceding each enlarged diameter section 16. Accordingly, the human observer is instructed to only pay attention to the yellow tape 22, which indicates the imminent passage of a "large body". The observer can then signal a technician within the cable engine van 30 that a large body is approaching and that the cable engine 32 must be adjusted to accommodate the large body.

The aforedescribed arrangement is advantageous for a number of reasons. For example, it is readily retrofittable into existing equipment without requiring major modification to the equipment. Further, since the sensing is of the non-contact type, there can be no slippage between the cable 10 and the sensor. Still further, since the sensing is of the non-contact type, the sensor does not have to be movable to accommodate the passage of an enlarged diameter section of the cable.

Accordingly, there has been disclosed an improved arrangement for monitoring the deployment of cable from a supply. While an illustrative embodiment of the inventive arrangement has been disclosed herein, it is understood that various modifications and adaptations to the disclosed embodiment will be apparent to one of ordinary skill in the art and it is therefore intended that this invention be limited only by the scope of the appended claims. Thus, while the invention has been described in the context of a cable laying ship, the present invention can also be utilized with cable deployed from a truck, an aircraft, a railroad car, etc. In addition, the predetermined signal generated by the passage of the high reflectivity tape can also be used to control devices such as brakes, motors, servos, etc.

What is claimed is:

1. An arrangement for monitoring the deployment past a defined area of cable from a supply, comprising:

a plurality of pieces of a first material having a first predetermined reflectivity characteristic and disposed at respective discrete longitudinally spaced locations on the exterior surface of the cable;

emitting means for emitting light having a predetermined wavelength characteristic and directing the emitted light toward said defined area;

sensing means for sensing light emanating from said defined area and for providing a predetermined signal when sensed light having said predetermined wavelength characteristic exceeds a predetermined level; and utilization means for receiving said predetermined signal and for utilizing the received predetermined signal to determine the length of cable deployed from the supply;

wherein the first predetermined reflectivity characteristic is such that light having said predetermined wavelength characteristic and reflected from said first material in said defined area is sensed by said sensing means to be at a level exceeding said predetermined level.

2. The arrangement according to claim 1 wherein the pieces of the first material are in the form of individual lengths of a high gain reflective flexible material tape each adhered to the cable.

3. The arrangement according to claim 1 further comprising:

at least one piece of a second material having a second predetermined reflectivity characteristic and disposed on the exterior of said cable, said second material being of a contrasting color with respect to said cable and said second predetermined reflectivity characteristic being sufficiently less than said first predetermined reflectivity characteristic so that light having said predetermined wavelength characteristic and reflected from said second material in said defined area is sensed by said sensing means to be at a level which is less than said predetermined level;

whereby said second material can be detected by a human observer without resulting in the providing of said predetermined signal by said sensing means.

4. The arrangement according to claim 3 wherein the first and second materials are of different colors so as to be distinguishable by a human observer.

5. The arrangement according to claim 3 wherein the at least one piece of the second material is in the form of a length of flexible tape adhered to the cable.

6. The arrangement according to claim 3 wherein said cable includes cable lengths of a uniform first diameter separated by cable sections of enlarged diameter and each of the at least one piece of the second material is disposed on a uniform first diameter length of the cable immediately preceding a respective enlarged diameter cable section;

whereby a human observer is notified in advance of the imminent passage of an enlarged diameter section of the cable past the defined area.

* * * * *